C. E. JOHANSSON.
ACCURATE MEASURING GAGE.
APPLICATION FILED OCT. 21, 1914.
1,217,312.
Patented Feb. 27, 1917.
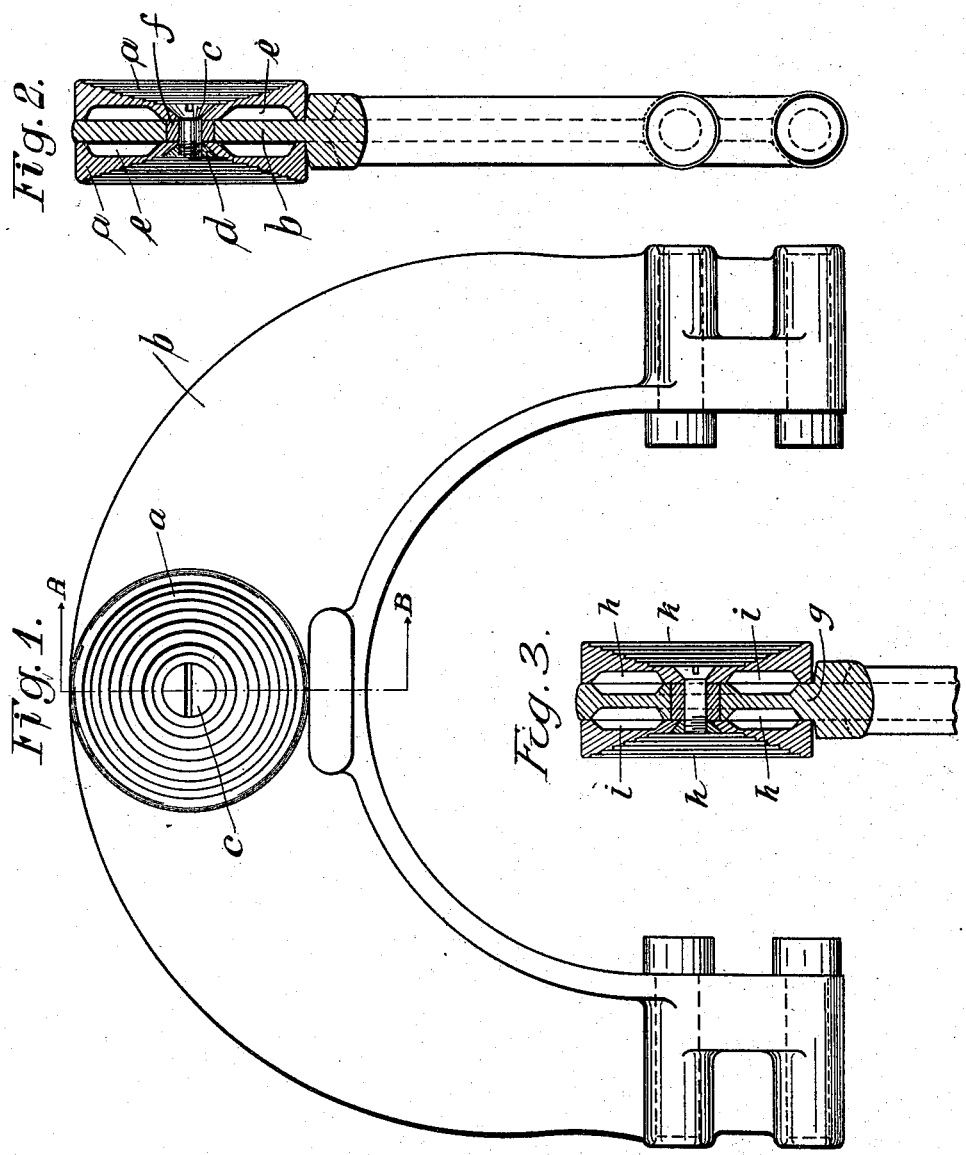

UNITED STATES PATENT OFFICE.

CARL EDVARD JOHANSSON, OF ESKILSTUNA, SWEDEN.

ACCURATE MEASURING-GAGE.

1,217,312.  Specification of Letters Patent.  Patented Feb. 27, 1917.

Application filed October 21, 1914. Serial No. 867,780.

*To all whom it may concern:*

Be it known that I, CARL EDVARD JOHANSSON, a subject of the King of Sweden, residing at Eskilstuna, in the Kingdom of Sweden, have invented new and useful Improvements in Accurate Measuring-Gages, of which the following is a specification, reference being had to the drawing accompanying and forming part hereof.

This invention relates to accurate measuring gages of the kind used to a large extent within the mechanical engineering industry. When using gages of this kind, it is of importance to prevent the heat of the hand from being transmitted to the metal gage, since, otherwise, the gage will expand, so that the accurate measure is lost and the measuring results become uncertain. In order to prevent said inconvenience, it has been proposed to provide the gages, at the point where, in using them, they are seized by the hand, with plates or the like made of heat insulating material, as for instance wood, ebonite or the like, so that the hand will be prevented from touching the material. Even such an arrangement has not, however, proved to be sufficient, because the heat of hand, when the gage is used for a long time, will be transmitted to the metal.

The object of this invention is to provide a gage of the kind mentioned with insulating plates so arranged that an insulation as complete as possible is attained. With this object in view the invention consists, chiefly, in this that the plates, at the side facing the gage, or the gage at the sides facing the insulating plates, are provided with recesses forming air spaces. On account of this, narrow edges only of the insulating plates bear against the metal, so that transmission of heat from the hand to the metal is prevented as far as possible. In case the plates in well-known manner are secured to the gage by a screw, a rivet or the like, said screw or rivet should, preferably, be surrounded by a ring or a socket made of heat insulating material preventing the heat from being transmitted in that way to the metal.

I attain this object and advantage by means of the construction shown in the accompanying drawing in which Figure 1 is a side view of a gage made in accordance with the invention and Fig. 2 shows the gage in section on the line A—B in Fig. 1, looking in the direction of the arrows. Fig. 3 shows a similar section of another embodiment.

In the drawing $a$, $a$ denote two plates or disks made of heat insulating material, as for instance wood, fiber, ebonite or the like, said plates or disks being placed at each side of the frame $b$ of the gage and secured to the frame by a screw $c$ passing through the same, and a nut $d$. Said plates or disks are, at the side facing the frame $b$ provided with recesses $e$, so that the insulating plates or disks bear against the metal with narrow edges only. Consequently, the recesses form insulating air spaces. For the screw $c$ may be substituted a rivet or the like.

In order to prevent the heat of the hand from being transmitted to the frame $b$ through the screw or rivet $c$, said screw or rivet is surrounded by an insulating ring $f$ which, preferably, is made of the same material as the plates or disks $a$. In this manner even the smallest gages may be provided with handles insulating the heat of the hand. Instead of providing the recesses in the plates, the recesses may be provided in the gage or in both the gage and the plates. Fig. 3 shows a gage the frame $g$ of which is provided with recesses $h$ corresponding with recesses $i$ in the insulating plates $k$. This construction is otherwise similar to that shown in Figs. 1 and 2.

Having thus described the invention, what I claim is:

1. The combination with a gage, of heat insulating means secured at each side thereof and having recesses which, at the side of said insulating means facing the gage, form air spaces and narrow edges bearing against the gage, means for securing said insulating means to the gage, and heat insulating means surrounding said securing means, substantially as and for the purpose set forth.

2. The combination with a gage, of heat insulating plates secured to the gage at each side thereof and having recesses which, at the side of said plates facing the gage, form air spaces and narrow edges bearing against the gage, a bar securing said plates to the gage, and a heat insulating annular member surrounding said bar, substantially as and for the purpose set forth.

In testimony whereof I have hereunto set my hand in presence of two subscribing witnesses.

CARL EDVARD JOHANSSON.

Witnesses:
FRED. NORDSJÖ,
THURE ÖSTERLING.

Copies of this patent may be obtained for five cents each, by addressing the "Commissioner of Patents, Washington, D. C."